United States Patent
Hsu et al.

(10) Patent No.: US 8,599,839 B2
(45) Date of Patent: Dec. 3, 2013

(54) SYSTEM AND METHOD FOR TRANSMITTING SERIAL DATA, AND RECORDING MEDIUM THEREOF

(75) Inventors: Chin-Shun Hsu, Kaohsiung (TW); Kuan-Rong Lee, Chaiyi (TW); Yu-Sheng Weng, Kaohsiung (TW)

(73) Assignee: Institute for Information Industry, Taipei (TW)

( * ) Notice: Subject to any disclaimer, the term of this patent is extended or adjusted under 35 U.S.C. 154(b) by 101 days.

(21) Appl. No.: 13/327,948

(22) Filed: Dec. 16, 2011

(65) Prior Publication Data

US 2013/0114618 A1    May 9, 2013

(30) Foreign Application Priority Data

Nov. 8, 2011 (TW) .............................. 100140737 A

(51) Int. Cl.
*H04L 12/50*    (2006.01)
*H04L 12/56*    (2011.01)

(52) U.S. Cl.
USPC .......................................... 370/366; 370/401

(58) Field of Classification Search
USPC ...................... 370/366, 400–402, 465, 466
See application file for complete search history.

(56) References Cited

U.S. PATENT DOCUMENTS

| | | | |
|---|---|---|---|
| 6,687,260 B1 * | 2/2004 | Peace | 370/450 |
| 6,826,405 B2 | 11/2004 | Doviak et al. | |
| 7,317,733 B1 * | 1/2008 | Olsson et al. | 370/466 |
| 2005/0175031 A1 * | 8/2005 | Harley, Jr. | 370/466 |
| 2009/0225766 A1 * | 9/2009 | Ihle et al. | 370/402 |
| 2010/0054260 A1 | 3/2010 | Pandey et al. | |

* cited by examiner

*Primary Examiner* — Hong Cho
(74) *Attorney, Agent, or Firm* — Muncy, Geissler, Olds & Lowe, PLLC

(57) ABSTRACT

A system and a method for transmitting serial data, and a recording medium thereof are provided, in which a host is connected to a portable device through network, and the portable device is connected to a serial device. The host includes a host control module, a data convert module, and a first communication module. The host control module generates and receives serial data. The data convert module is connected between the first communication module and the host control module to convert formats of serial data and network packet data. The first communication module performs communication of network packet data between the data convert module and the portable device. The portable device is configured between the host and the serial device, and converts formats of the serial data and the network packet data by using a bridge module, so as to establish connection between the host and the serial device.

19 Claims, 3 Drawing Sheets

SYSTEM AND METHOD FOR TRANSMITTING SERIAL DATA, AND RECORDING MEDIUM THEREOF

CROSS-REFERENCE TO RELATED APPLICATION

This application claims the benefit of Taiwan Patent Application No. 100140737, filed on Nov. 8, 2011, which is hereby incorporated by reference for all purposes as if fully set forth herein.

BACKGROUND OF THE INVENTION

1. Field of Invention

The present invention relates to connection technologies of a serial device, and more particularly to a system and a method for transmitting serial data, and a recording medium thereof that are capable of spanning same or different work platforms and implementing remote connection of the serial device.

2. Related Art

In the prior art, a host controls a serial device through the following two manners:

In the first manner, the serial device is connected to a serial port of a desktop computer host. An operating system of the host implements connection between the host and the serial device through a serial communication method and a drive program of the serial device. A user can control the serial device and obtain response data from the serial device through user interface software for installing the operating system.

In the second manner, the serial device is connected to a serial port of a portable computer (ex: a notebook computer), and an operating system of the portable computer implements the connection between the portable computer and the serial device through a serial communication method and a drive program of the serial device. The portable computer is connected to the host by network or telecommunication, and the software configured to the portable computer and the host is client-server software in which the host is primary and the portable computer is secondary. The user can control the portable device through a software control interface of the host, and control the serial device or obtain response data of the serial device indirectly. Alternatively, the user can directly control the serial device through a control interface of the software of the portable computer, and transmit the related necessary data to the host. The host software performs processing or analysis according to the data provided by the portable computer.

However, there are disadvantages in these manners. In the first manner, the host is connected to the serial device in a limited distance; therefore this manner has low practicality. In the second manner, although the host is connected to the serial device for communication in a long distance, if the operating system of the portable computer is replaced or the portable computer is replaced with the portable device (ex: a tablet computer or a smart phone), it is required to install the corresponding drive program and the control software according to the replaced operating system (or the replace portable device). Therefore, the development cost of the control software and the drive program needs to be consumed additionally. Further, if the serial communication between the host and the serial device can be performed only through negotiated encryption and decryption operation mutually, the host cannot remotely communicate with the serial device through the second manner, so the practicality of the second manner is greatly lowered.

SUMMARY OF THE INVENTION

In view of this, in order to solve the above problem, the present invention provides a system and a method for transmitting serial data, and a recording medium thereof that are capable of spanning same or different work platforms and implementing remote connection of the serial device.

The system for transmitting serial data provided by the present invention includes a host and a portable device. The host includes a host control module, a data convert module, and a first communication module. The portable device includes a device control module, a bridge module, and a second communication module.

The host control module is used for transmitting first serial data, and receiving second serial data. The data convert module is used for obtaining the first serial data and converting the first serial data into first network packet data, converting second network packet data into the second serial data, and transmitting the second serial data to the host control module. The first communication module is used for transmitting the first network packet data to the portable device, receiving the second network packet data transmitted from the portable device, and transmitting the second network packet data to the data convert module.

The second communication module is used for obtaining the first network packet data transmitted from the first communication module, and transmitting the second network packet data to the first communication module. A bridge module is used for converting the first network packet data into the first serial data, converting the second serial data into the second network packet data, and transmitting the second network packet data to the second communication module. A serial connect module is used for obtaining the first serial data transmitted from the bridge module to transmit to a serial device, and obtaining the second serial data transmitted from the serial device to transmit to the bridge module.

The method for transmitting serial data provided by the present invention is applicable to a case that a host is connected to a portable device through network, and the portable device is connected to a serial device. The method includes: providing a host control module of the host to send first serial data and receive second serial data; converting the first serial data into first network packet data through a data convert module of the host, and converting obtained second network packet data back into the second serial data; establishing network connection between a first communication module of the host and a second communication module of the portable device, where the second communication module is used for receiving the first network packet data output by the first communication module, and the first communication module is used for receiving the second network packet data output by the second communication module; converting the first network packet data obtained by the second communication module back into the first serial data, and converting the second serial data into the second network packet data through a bridge module of the portable device; and transmitting the first serial data transmitted from the bridge module to the serial device, and transmitting the second serial data of the serial device to the bridge module through a serial connect module of the portable device.

Further, in the system and method for transmitting the serial data, the data convert module may include a virtual serial port management module, and a serial and network data convert module. The virtual serial port management module is used for establishing a virtual serial port corresponding to the serial device, so as to receive the first serial data sent from the host control module and transmit the second serial data to the host control module. The serial and network data convert module is used for converting the first serial data into the first network packet data, transmitting the first network packet data to the first communication module, converting the second network packet data received by the first communication module into the second serial data, and guiding the second serial data to a virtual serial port.

The present invention further provides a recording medium, which stores a computer readable program code. A host and a portable device connected through the network read the program code to execute a serial data transmission method in cooperation. The process is as described in the above, which is not described herein again.

The features of the present invention are as follows. The host may be connected to the serial device in an unlimited distance. In addition, the host may directly control the serial device without the limitation of the operating system of the portable device, so it is not required to additionally develop control software and a drive program installed on the portable device, thereby reducing the development cost of the software and the drive program. Moreover, the host may directly control the serial device without the limitation of the operating system of the portable device, so the serial communication only performed through mutually negotiated encryption and decryption operation may be executed between the host and the serial device, thereby greatly improving the practicality of the system.

The system and the method provided by the present invention may achieve the objective of expanding the serial port device on a heterogeneous platform. Through the system and the method of the present invention, the portable device with a different operating system from the host may be connected to the serial port device and the host for bridging data transmission between the host and the serial port device. When the encryption and decryption method is required for transmission between the host and the serial port device, while the portable device does not have the encryption and decryption function, the system and method of the present invention can still enable the portable device and the serial port device to operate normally, thereby easily achieving the objective of the expansion of the heterogeneous system.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The preferred embodiment of the present invention is described in detail in the following with reference to the drawings.

Figure 1:
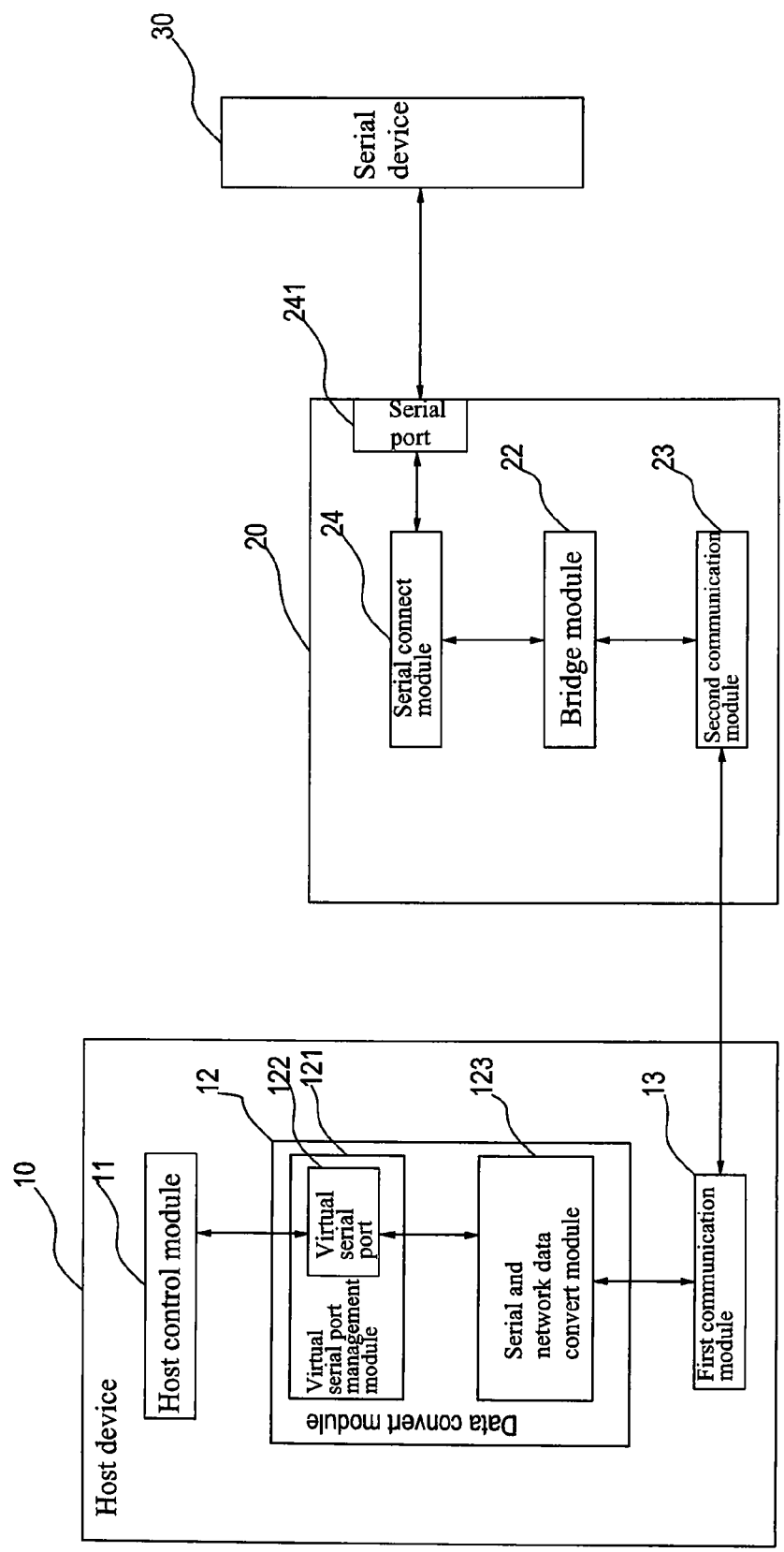
FIG. 1 is a schematic view of system architecture according to an embodiment of the present invention.

FIG. 1 is a schematic view of system architecture according to an embodiment of the present invention. Referring to FIG. 1 first, the system includes a host 10, a portable device 20, and more than one serial device 30 connected to a serial port 241 of the portable device 20. The specifications of the serial port include RS-232, RS-422, RS-485, or further include a connection port conforming to the specification of a Universal Serial Bus (USB).

The host 10 includes a host control module 11, a data convert module 12, and a first communication module 13. The host control module 11 are controlled by a user through a man-machine interface of the host 10, and the host control module 11 is used for sending first serial data for controlling or connecting the serial device 30.

The data convert module 12 receives the first serial data, and converts the first serial data into first network packet data; and receives second network packet data from the portable device 20, and converts the second network packet data into second serial data to transmit the second serial data to the host control module 11. In an embodiment, the data convert module 12 is, for example, a combination of a virtual serial port management module 121 and a serial and network data convert module 123, but the present invention is not limited thereto.

The virtual serial port management module 121 is used for establishing a virtual serial port 122 corresponding to the serial device 30. The virtual serial port management module 121 is controlled by the user through the host control module 11 to establish the virtual serial port 122; or the virtual serial port management module 121 is controlled by the user through the man-machine interface (not shown) of the virtual serial management module 121 to establish the virtual serial port 122.

The virtual serial port 122 receives the first serial data. The serial and network data convert module 123 is connected to the virtual serial port 122 and the first communication module 13, and converts the first serial data received by the virtual serial port 122 into the first network packet data conforming to a network transmission format, and then transmits the first network packet data to the first communication module 13. The first communication module 13 transmits the first network packet data to the portable device 20 through wired network or wireless network.

The portable device 20 includes a second communication module 23, a bridge module 22, and a serial connect module 24.

The second communication module 23 is used for receiving the first network packet data, and transmitting the first network packet data to the bridge module 22. The bridge module 22 converts the first network packet data back into the first serial data conforming to a data format of the serial communication manner, and transmits the first serial data to the serial connect module 24. The serial connect module 24 is connected to the serial device 30 through a serial port 241, and directly transmits the first serial data to the serial device 30. The serial device 30 executes the corresponding operation according to the first serial data, which is like the host control module 11 directly controlling the serial device 30.

On the other hand, the serial device 30 generates second serial data when responding to the host 10. The second serial data is received by the serial connect module 24 through the serial port 241 of the portable device 20. The serial connect module 24 transmits the second serial data to the bridge module 22. The bridge module 22 converts the second serial data into the second network packet data conforming to a data format of the network transmission, and transmits the second network packet data to the second communication module 23. The second communication module 23 transmits the second network packet data to the host 10.

The first communication module 13 receives the second network packet data and forwards the second network packet data to the data convert module 12. The serial and network data convert module 123 converts the second network packet data into second serial data which conforms to the serial communication data format, and guides the second serial data to the virtual serial port 122, and then the host control module 11 obtains the second serial data transmitted from the virtual serial port 122, that is, the host control module 11 directly obtains response data from the serial device 30.

Figure 2:
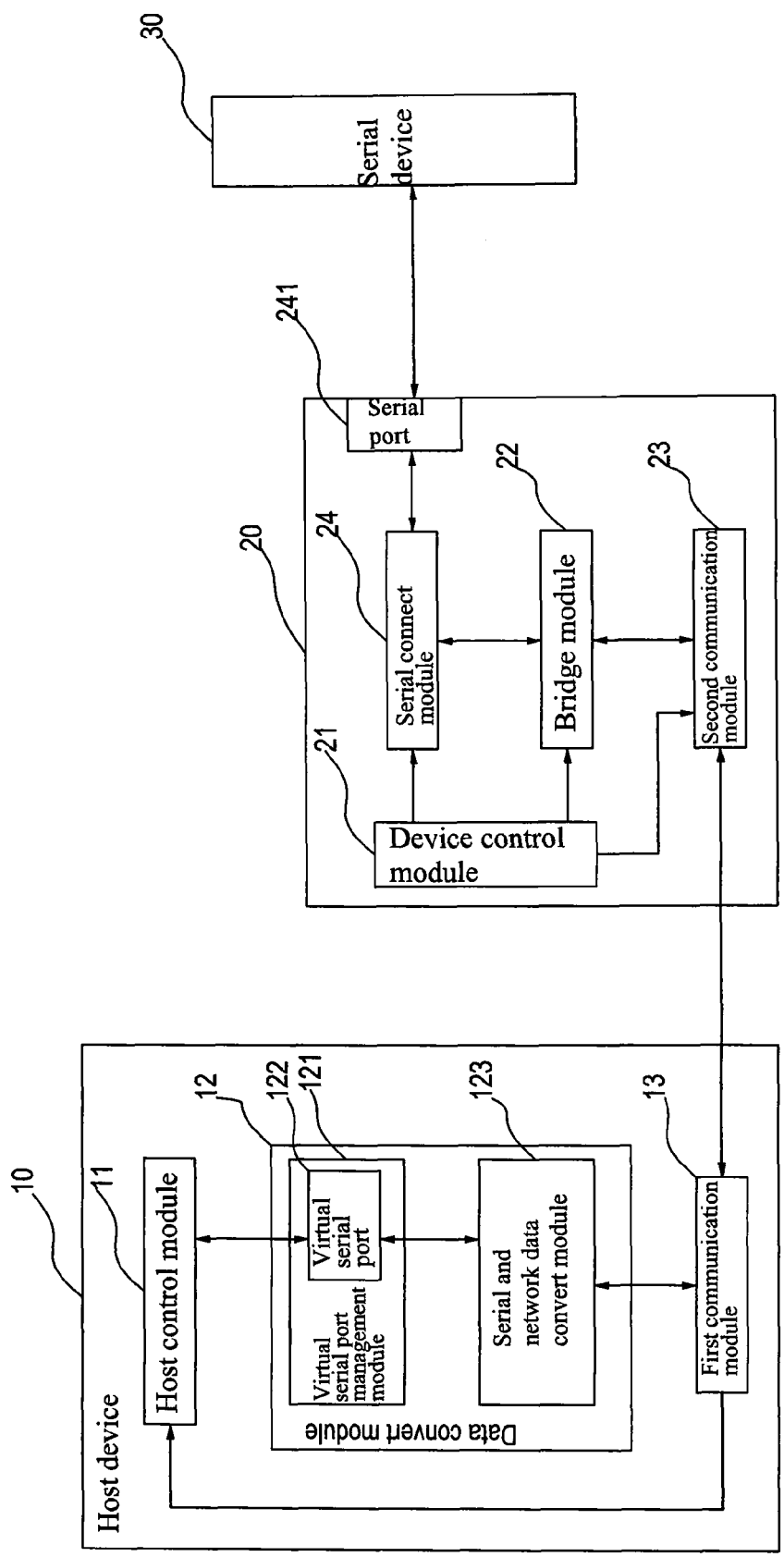
FIG. 2 is a schematic view of another system architecture according to an embodiment of the present invention.

Afterwards, FIG. 2 is a schematic view of another system architecture according to an embodiment of the present invention, and referring to FIG. 2, the difference of FIG. 1 and FIG. 2 lies in that, the portable device 20 further includes a device control module 21 for connecting the bridge module 22, the serial connect module 24, and the second communication module 23. At least one serial port parameter is inputted by the user through a man-machine interface (not shown in FIG. 2) of the device control module 21, so as to set the bridge module 22 and the serial connect module 24. The serial connect module 24 performs serial communication with the serial device 30 according to the serial port parameter, and the bridge module 22 performs conversion operation between network packet data and data of the serial port 241 according to the serial port parameter. The serial port parameter may be a serial port number parameter, a serial data format parameter, a transmission rate parameter or a parity parameter.

Further, the device control module 21 may be connected to the host control module 11 through the first communication module 13 and the second communication module 23, and transmit the serial port parameter to the host control module 11. The host control module 11 sets the data convert module 12 according to the serial port parameter, and the data convert module 12 performs conversion operation between the network packet data and the data of the serial port 241 according to the set serial port parameter.

On the other hand, control data for controlling the serial device 30 is inputted by the user through the device control module 21, and the control data is transmitted to the host control module 11 through the first communication module 13 and the second communication module 23. The host control module 11 then sends the first serial data according to the control data.

The host control module 11 and the device control module 21 may be implemented through any manner of software (ex: an application program read by the host 10 and the portable device 20), hardware (ex: a computation unit such as a central processing unit), or a combination of software and hardware (ex: the application program is burned on a specific chip).

Figure 3:
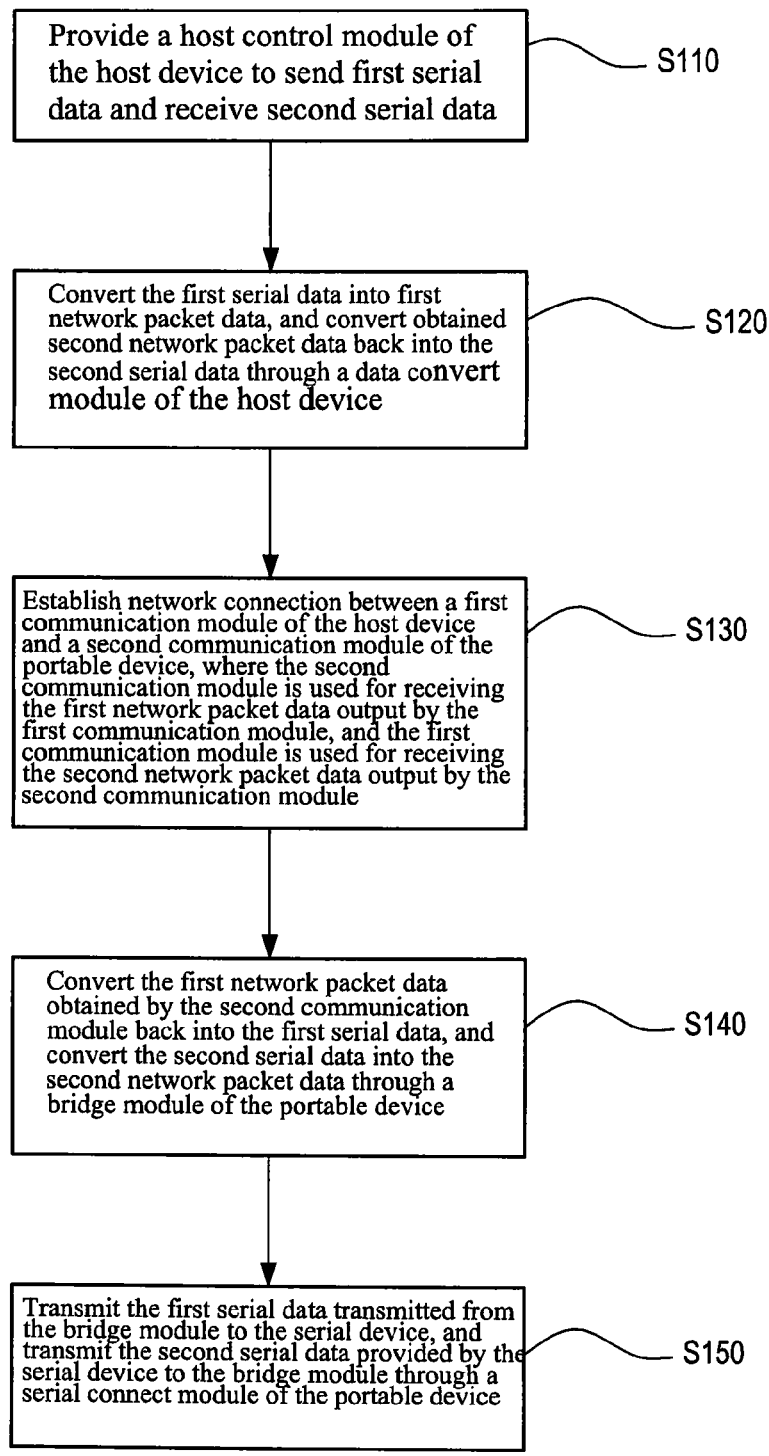
FIG. 3 is a schematic flow chart of a method for transmitting serial data according to an embodiment of the present invention.

In addition, FIG. 3 is a schematic flow chart of a method for connecting a serial device 30 according to an embodiment of the present invention. Referring to FIG. 3, the method is applicable to a case that a host 10 is connected to a portable device 20 through the network, in which a serial device 30 is mounted on a serial port 241 of the portable device 20. Refer to the system views shown in FIG. 1 and FIG. 2. A process of the host 10 communicating with the serial device 30 is described, and the method thereof includes the following steps.

A host control module 11 of the host 10 is provided, so as to send first serial data and receive second serial data (step S110). As described in the above, the host module 11 is controlled by the user through the man-machine interface of the host 10 to send the first serial data. On the other hand, the host control module 11 also receives second serial data converted back by a data convert module 12.

Through the data convert module 12 of the host 10, the first serial data is converted into first network packet data, and the obtained second network packet data is converted back into the second serial data (step S120).

In the step, a virtual serial port management module 121 establishes a virtual serial port 122 corresponding to the serial device 30. The virtual serial port management module 121 obtains the first serial data through the virtual serial port 122, and converts the first serial data into the first network packet data.

On the other hand, a serial and network data convert module 123 obtains the second network packet data from a first communication module 13, and converts the second network packet data back into the second serial data, and then transmits the second serial data to the host control module 11 through the virtual serial port 122.

Network connection is established between the first communication module 13 of the host 10 and the second communication module 23 of the portable device 20, in which the second communication module 23 is used for receiving the first network packet data output by the first communication module 13, and the first communication module 13 is used for receiving the second network packet data output by the second communication module 23 (step S130). However, the first communication module 13 is connected to the second communication module 23 via network in a wired or a wireless manner.

Through a bridge module 22 of the portable device 20, the first network packet data obtained by the second communication module 23 is converted back into the first serial data, and the second serial data is converted into the second network packet data (step S140). When the bridge module 22 obtains the first network data transmitted from the second communication module, the bridge module 22 converts the first network packet data back into the first serial data, and transmits the converted first serial data to the serial connect module 24.

On the other hand, the bridge module 22 may also obtain the second serial data transmitted from the serial connect module 24, and converts the second serial data into the second network packet data, and then transmits the converted second network packet data to the second communication module 23.

Through the serial connect module 24 of the portable device 20, the first serial data transmitted from the bridge module 22 is transmitted to the serial device 30, and the second serial data provided by the serial device 30 is transmitted to the bridge module 22 (step S150). As described in the above, the serial connect module 24 transmits the first serial data to the serial device 30 through the serial port 241. However, the serial device 30 generates second serial data when responding to the host 10. The serial connect module 24 obtains the second serial data through the serial port 241 of the portable device 20.

In this way, as for the portable device, at least one serial port parameter may be inputted by the user through a man-machine interface (not shown) of the device control module 21, so as to set the bridge module 22 and the serial connect module 24. In step S150, the serial connect module 24 performs serial communication with the serial device 30 according to the serial port parameter. In step S140, the bridge module 22 performs conversion operation between the network packet data and data of the serial port 241 according to the serial port parameter.

Further, the device control module 21 may be connected to the host control module 11 through the first communication module 13 and the second communication module 23, and transmit the serial port parameter to the host control module 11. The host control module 11 sets the data convert module 12 according to the serial port parameter, and the data convert module 12 performs conversion operation between the network packet data and the data of the serial port 241 according to the set serial port parameter. However, the setting operation should be implemented before step S110.

On the other hand, the control data for controlling the serial device 30 also is inputted by the user through the device control module 21, and is transmitted to the host control module 11 through the first communication module 13 and the second communication module 23. The host control module 11 then sends the first serial data according to the control data. A time point of the host 10 communicating with the serial device 30 can be controlled by the user through this manner.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system for transmitting serial data, comprising:
   a host, comprising:
      a host control module, for transmitting first serial data, and receiving second serial data;
      a data convert module, for obtaining the first serial data and converting the first serial data into first network packet data, converting second network packet data into the second serial data, and transmitting the second serial data to the host control module;
      a first communication module, for outputting the first network packet data, receiving the second network packet data, and transmitting the second network packet data to the data convert module; and
   a portable device, comprising:
      a second communication module, for obtaining the first network packet data transmitted from the first communication module, and transmitting the second network packet data to the first communication module;
      a bridge module, for converting the first network packet data into the first serial data, converting the second serial data into the second network packet data, and transmitting the second network packet data to the second communication module; and
      a serial connect module, for obtaining the first serial data transmitted from the bridge module to transmit to a serial device, and obtaining the second serial data transmitted from the serial device to transmit to the bridge module.

2. The system for transmitting serial data according to claim 1, wherein the portable device further comprises a device control module, for connecting the bridge module and the serial connect module, and setting at least one serial port parameter in the bridge module and the serial connect module, so that the serial connect module communicates with the serial device, and the bridge module performs conversion operation between network packet data and serial port data according to the serial port parameter.

3. The system for transmitting serial data according to claim 2, wherein the serial port parameter at least comprises a serial port number parameter, a serial data format parameter, a transmission rate parameter or a parity parameter.

4. The system for transmitting serial data according to claim 2, wherein the device control module is connected to the host control module through the first communication module and the second communication module, and transmits the serial port parameter to the host control module; the host control module sets the data convert module according to the serial port parameter; and the data convert module performs conversion operation between network packet data and serial port data according to the serial port parameter.

5. The system for transmitting serial data according to claim 1, wherein the data convert module comprises:
   a virtual serial port management module, for establishing a virtual serial port corresponding to the serial device, so as to receive the first serial data and transmit the second serial data; and
   a serial and network data convert module, for converting the first serial data received by the virtual serial port into the first network packet data, transmitting the first network packet data to the first communication module, converting the second network packet data received by the first communication module into the second serial data, and guiding the second serial data to the virtual serial port.

6. The system for transmitting serial data according to claim 1, wherein the portable device further comprises a device control module, and the device control module controls the host control module through the first communication module and the second communication module, so that the host control module sends the first serial data.

7. The system for transmitting serial data according to claim 1, wherein the serial connect module is connected to the serial device through a serial port, and the serial port is RS-232, RS-422, RS-485, or a connection port with the specification of a Universal Serial Bus (USB).

8. A method for transmitting serial data, applicable to a case that a host is connected to a portable device through network, and the portable device is connected to a serial device, the method comprising:
   providing a host control module of the host to send first serial data and receive second serial data;
   converting the first serial data into first network packet data, and converting obtained second network packet data back into the second serial data through a data convert module of the host;
   establishing network connection between a first communication module of the host and a second communication module of the portable device, wherein the second communication module is used for receiving the first network packet data output by the first communication module, and the first communication module is used for receiving the second network packet data output by the second communication module;
   converting the first network packet data obtained by the second communication module back into the first serial data, and converting the second serial data into the second network packet data through a bridge module of the portable device; and
   transmitting the first serial data transmitted from the bridge module to the serial device, and transmitting the second serial data of the serial device to the bridge module through a serial connect module of the portable device.

9. The method for transmitting serial data according to claim 8, wherein the portable device comprises a device control module, for connecting the bridge module and the serial connect module, and setting at least one serial port parameter in the bridge module and the serial connect module, so that the serial connect module communicates with the serial device, and the bridge module performs conversion operation between network packet data and serial port data according to the serial port parameter.

10. The method for transmitting serial data according to claim 9, wherein the serial port parameter at least comprises a serial port number parameter, a serial data format parameter, a transmission rate parameter or a parity parameter.

11. The method for transmitting serial data according to claim 9, wherein the device control module is connected to the host control module through the first communication module and the second communication module, and transmits the serial port parameter to the host control module; the host control module sets the data convert module according to the serial port parameter; and the data convert module performs conversion operation between network packet data and serial port data according to the serial port parameter.

12. The method for transmitting serial data according to claim 8, wherein the data convert module comprises a virtual serial port management module, and a serial and network data convert module, and the step of converting the first serial data into first network packet data and converting obtained second network packet data back into the second serial data through a data convert module of the host comprises:
    receiving the first serial data, and sending the second serial data of the serial and network data convert module through a virtual serial port corresponding to the serial device, wherein the virtual serial port is established by the virtual serial port management module; and
    converting the first serial data received by the virtual serial port management module into the first network packet data and converting the second network packet data received by the first communication module into the second serial data through the serial and network data convert module.

13. The method for transmitting serial data according to claim 8, wherein the portable device further comprises a device control module, and the device control module controls the host control module through the first communication module and the second communication module, so that the host control module sends the first serial data.

14. A non-transitory recording medium, stored with a computer readable program code, wherein a host and a portable device connected through network read the program code to execute a serial data transmission method in cooperation, so that the host is connected to a serial device connected to the portable device, and the method comprises:
    providing a host control module of the host to send first serial data and receive second serial data;
    converting the first serial data into first network packet data, and converting obtained second network packet data back into the second serial data through a data convert module of the host;
    establishing network connection between a first communication module of the host and a second communication module of the portable device, wherein the second communication module is used for receiving the first network packet data output by the first communication module, and the first communication module is used for receiving the second network packet data output by the second communication module;
    converting the first network packet data obtained by the second communication module back into the first serial data, and converting the second serial data into the second network packet data through a bridge module of the portable device; and
    transmitting the first serial data transmitted from the bridge module to the serial device, and transmitting the second serial data of the serial device to the bridge module through a serial connect module of the portable device.

15. The non-transitory recording medium according to claim 14, wherein the portable device comprises a device control module, for connecting the bridge module and the serial connect module, and setting at least one serial port parameter in the bridge module and the serial connect module, so that the serial connect module communicates with the serial device, and the bridge module performs conversion operation between network packet data and serial port data according to the serial port parameter.

16. The non-transitory recording medium according to claim 15, wherein the serial port parameter at least comprises a serial port number parameter, a serial data format parameter, a transmission rate parameter or a parity parameter.

17. The non-transitory recording medium according to claim 15, wherein the device control module is connected to the host control module through the first communication module and the second communication module, and transmits the serial port parameter to the host control module; the host control module sets the data convert module according to the serial port parameter; and the data convert module performs conversion operation between network packet data and serial port data according to the serial port parameter.

18. The non-transitory recording medium according to claim 14, wherein the data convert module comprises a virtual serial port management module, and a serial and network data convert module, and the step of converting the first serial data into first network packet data and converting obtained second network packet data back into the second serial data through a data convert module of the host comprises:
    receiving the first serial data, and sending the second serial data of the serial and network data convert module through a virtual serial port corresponding to the serial device, wherein the virtual serial port is established by the virtual serial port management module; and
    converting the first serial data received by the virtual serial port management module into the first network packet data and converting the second network packet data received by the first communication module into the second serial data through the serial and network data convert module.

19. The non-transitory recording medium according to claim 14, wherein the portable device further comprises a device control module, and the device control module controls the host control module through the first communication module and the second communication module, so that the host control module sends the first serial data.

* * * * *